(12) United States Patent
Schumacher

(10) Patent No.: US 8,944,482 B2
(45) Date of Patent: Feb. 3, 2015

(54) CAST STEEL RAILWAY WHEEL

(75) Inventor: Jon Schumacher, Granite City, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 455 days.

(21) Appl. No.: 13/362,457

(22) Filed: Jan. 31, 2012

(65) Prior Publication Data

US 2013/0193705 A1    Aug. 1, 2013

(51) Int. Cl.
*B60B 17/00*    (2006.01)
*B60B 3/02*    (2006.01)

(52) U.S. Cl.
USPC ..................... 295/27; 295/26; 301/64.102

(58) Field of Classification Search
CPC .. B60B 17/0006; B60B 17/001; B60B 3/002; B60B 3/004; B60B 3/005; B60B 3/007; B60B 3/02; B60B 3/06; B60B 3/12; B60B 1/08
USPC ........ 295/21, 25, 26, 27; 301/63.101, 63.107, 301/64.101, 64.102, 65, 66
See application file for complete search history.

(56) References Cited

U.S. PATENT DOCUMENTS

| | | | | |
|---|---|---|---|---|
| 416,637 A | * | 12/1889 | Morrissey et al. | 295/22 |
| 534,976 A | * | 2/1895 | Sperry | 188/218 R |
| 788,677 A | * | 5/1905 | Sherman | 295/27 |
| 830,363 A | * | 9/1906 | Pilcher et al. | 295/27 |
| D57,246 S | * | 3/1921 | Manu | D12/212 |
| 1,591,003 A | * | 6/1926 | Vincent | 295/27 |
| 2,042,160 A | * | 5/1936 | Pflager | 295/27 |
| 2,730,906 A | * | 1/1956 | Dickerson | 474/174 |
| 3,038,755 A | | 6/1962 | Keysor | |
| 4,699,417 A | * | 10/1987 | Spiller et al. | 295/7 |
| 5,333,926 A | | 8/1994 | Christie et al. | |
| 6,932,144 B2 | | 8/2005 | Shirley et al. | |
| 7,017,647 B2 | | 3/2006 | Bland | |

* cited by examiner

*Primary Examiner* — Kip T Kotter
(74) *Attorney, Agent, or Firm* — Edward J. Brosius

(57) ABSTRACT

A cast steel railway wheel includes a hub that has an axial bore. A rim is concentric with the bore. A plate extends substantially radially from the hub to the rim. The plate has a front face and a rear face. The plate has a plurality of spokes that extend between the hub and the rim. Adjacent spokes have different thicknesses defined between the front face and the rear face.

15 Claims, 5 Drawing Sheets

CAST STEEL RAILWAY WHEEL

BACKGROUND OF THE INVENTION

The subject matter herein relates generally to casting objects using a casting operation.

The steel railway wheels are manufactured during a casting operation wherein molten steel is poured into a machined graphite mold. The mold typically includes a top half or cope that is usually a graphite block and a bottom half or drag that is also usually a graphite block. The top portion or front face of the object being cast is machined in the cope and the bottom portion or rear face of the object being cast is machined in the drag. The mold includes sections that form a hub, plate and rim of the railway wheel. When the cope section and drag section are combined to form a complete mold, such complete mold is positioned at a pouring station wherein molten steel is poured into the cavity in the mold to form the hub, plate and rim of the railway wheel.

In some known assemblies, a central riser is provided in the cope section of the mold such that additional molten metal can be held as necessary to downwardly fill into the mold during cooling and solidification of the railway wheel just after pouring. There are accepted standards for porosity of steel railway wheels that must be met by designing the central riser to hold an adequate volume of metal to fill downwardly into the molds during cooling and solidification of the wheel. Upon filling of the mold cavity and central riser, the metal pouring is stopped and the graphite mold is then moved from the pouring station allowing sufficient time for the steel to solidify before the cope and drag sections are separated.

In a machined graphite mold, the graphite absorbs heat from the molten steel in a manner such that the molten wheel is fairly rapidly cooled and solidified at the outer surface in contact with the graphite. This allows a high production rate of wheels as the cope and drag can be fairly quickly separated from each other shortly after pouring thereby allowing the wheel to be properly cooled and otherwise heat treated during its manufacture. Due to the rapid absorption of heat from the molten steel by the graphite mold, it is current practice to provide a thick plate between the hub and rim to ensure that the center of the plate remains molten for a sufficient amount of time to allow the excess molten metal in the central riser to flow from the hub, through the plate and to the rim to achieve the desired porosity in the railway wheel. The added thickness of the plate adds to the overall weight of the railway wheel. The extra material of the plate may be later machined away, but this process adds time and cost to the manufacturing process.

It is desirable to decrease the amount of material in the plate, but still allow the plate to remain molten long enough to achieve the desired porosity of the cast steel railway wheel.

BRIEF DESCRIPTION OF THE INVENTION

In one embodiment, a cast steel railway wheel is provided having a hub that has an axial bore. A rim is concentric with the bore. A plate extends substantially radially from the hub to the rim. The plate has a front face and a rear face. The plate has a plurality of spokes that extend between the hub and the rim. Adjacent spokes have different thicknesses defined between the front face and the rear face.

Optionally, the thicker spokes may allow a greater volume of molten metal to flow from the hub toward the rim during casting of the railway wheel. The spokes may be integral with one another and formed during a casting of the railway wheel such that the plate may be continuous between the hub and the rim. Optionally, the spokes may include a series of circumferentially positioned and alternating major and minor spokes. The major spokes may be thicker than adjacent minor spokes. The minor spokes may be thinner than adjacent major spokes. The major spokes may include ridges that increase the thickness of the major spokes. The minor spokes may have voids exterior thereof defined between the ridges.

Optionally, the front face of the plate may be smooth and continuous. The rear face of the plate may be discontinuous and defined by a series of ridges and voids defining corresponding spokes. The spokes may have shoulders that define boundaries between adjacent spokes. The difference in thicknesses between adjacent spokes may generally decrease travelling radially outward along the spokes. Optionally, the spokes may have hub ends and rim ends. The thicknesses of the minor spokes at the hub ends may be significantly less than the thicknesses of the major spokes at the hub ends. The thicknesses of the minor spokes at the rim ends may be approximately equal to the thicknesses of the major spokes at the rim ends.

In another embodiment, a cast steel railway wheel is provided having a hub that has an axial bore. A rim is concentric with the bore. A plate extends substantially radially from the hub to the rim. The plate has a front face and a rear face. The plate has a thickness dimension defined between the front and rear faces. On the plate, at least one of the front face and the rear face includes a series of circumferentially positioned and alternating ridges and voids. The ridges are defined as being thicker than adjacent voids and the voids are defined as being thinner than adjacent ridges.

Optionally, the thicker ridges may allow a greater volume of molten metal to flow from the hub toward the rim during casting of the railway wheel. The difference in thicknesses between the ridges and voids may generally decrease travelling radially outward from the hub. The plate may include shoulders that define boundaries between the ridges and voids. Optionally, the ridges may comprise approximately half of the plate and the voids may comprise approximately half of the plate. The plate may include between approximately four and eight ridges with the voids interleaved between the ridges. The ridges and voids may define approximately equal truncated sectors of the plate. The ridges may be thicker proximate to the hub and thinner proximate to the rim. Optionally, the ridges and voids may be provided on both the front face and the rear face. The ridges on the front and rear faces may be generally aligned with each other. The voids on the front and rear faces may be generally aligned with each other.

In a further embodiment, a casting assembly for making a cast steel railway wheel is provided having a ladle for holding a molten metal. The assembly includes a mold for receiving the molten metal from the ladle. The mold has a cope section and a drag section with a mold cavity defined therebetween shaped to form the railway wheel. The cope section has a first cavity face that defines part of the mold cavity. The drag section has a second cavity face that defines part of the mold cavity. At least one of the first and second cavity faces has a series of circumferentially positioned and alternating bosses and cavities that form corresponding ridges and voids on the surface of the railway wheel when cast.

Optionally, the assembly may further include a hub core assembly received in the mold at a radially centrally location of the mold cavity. The hub core assembly may have a hub riser configured to receive excess molten metal during casting. The hub riser supplies the excess molten metal to the mold cavity during cooling and solidification of the railway wheel. A greater volume of molten metal pours into the mold cavity through the area aligned with the cavities than through the area aligned with the bosses.

Optionally, the first cavity face may be generally smooth and does not include bosses and cavities, whereas the second cavity face includes the bosses and cavities. Optionally, shoulders may extend between the bosses and cavities. The shoulders may be generally perpendicular to the corresponding first or second cavity face. Optionally, the bosses may comprise approximately half of the corresponding cavity face and the cavities may comprise approximately half of the corresponding cavity face. The bosses and cavities may define approximately equal truncated sectors of the corresponding cavity face. The mold cavity may have a substantially constant thickness between the first and second cavity faces along the bosses when traveling radially outward along the bosses. The mold cavity may have a generally decreasing thickness between the first and second cavity faces along the cavities when travelling radially outward along the cavities.

In a further embodiment, a method of making a cast steel railway wheel includes providing a mold having a cope section and a drag section with a mold cavity defined therebetween shaped to form the railway wheel. The cope section has a first cavity face that defines part of the mold cavity. The drag section has a second cavity face that defines part of the mold cavity. At least one of the first and second cavity faces has a series of circumferentially positioned and alternating bosses and cavities that form corresponding ridges and voids on the surface of the railway wheel. The cope section having a radially centrally located hub portion and the drag section having a radially centrally located hub portion. The method includes pouring molten metal into the hub portions of the drag section and the cope section such that the molten metal enters the mold cavity in both the cope section and the drag section. The method includes pouring molten metal into a hub riser aligned with the hub portions. The molten metal in the hub riser is used to supply molten metal to the mold cavity after cessation of pouring the molten metal. A greater volume of molten metal pours into the mold cavity through the areas aligned with the cavities than the areas aligned with the bosses.

Optionally, the mold cavity may have a thickness defined between the first and second cavity faces. The thickness of the mold cavity in the areas aligned with the cavities may be greater than the thickness of the mold cavity in the areas aligned with the bosses. Optionally, the method may include gravity pouring molten metal from the hub riser into the mold cavity as the railway wheel cools and solidifies. The cavities may provide a larger area in the mold cavity for the molten metal to flow than the bosses.

DETAILED DESCRIPTION OF THE INVENTION

Figure 1:
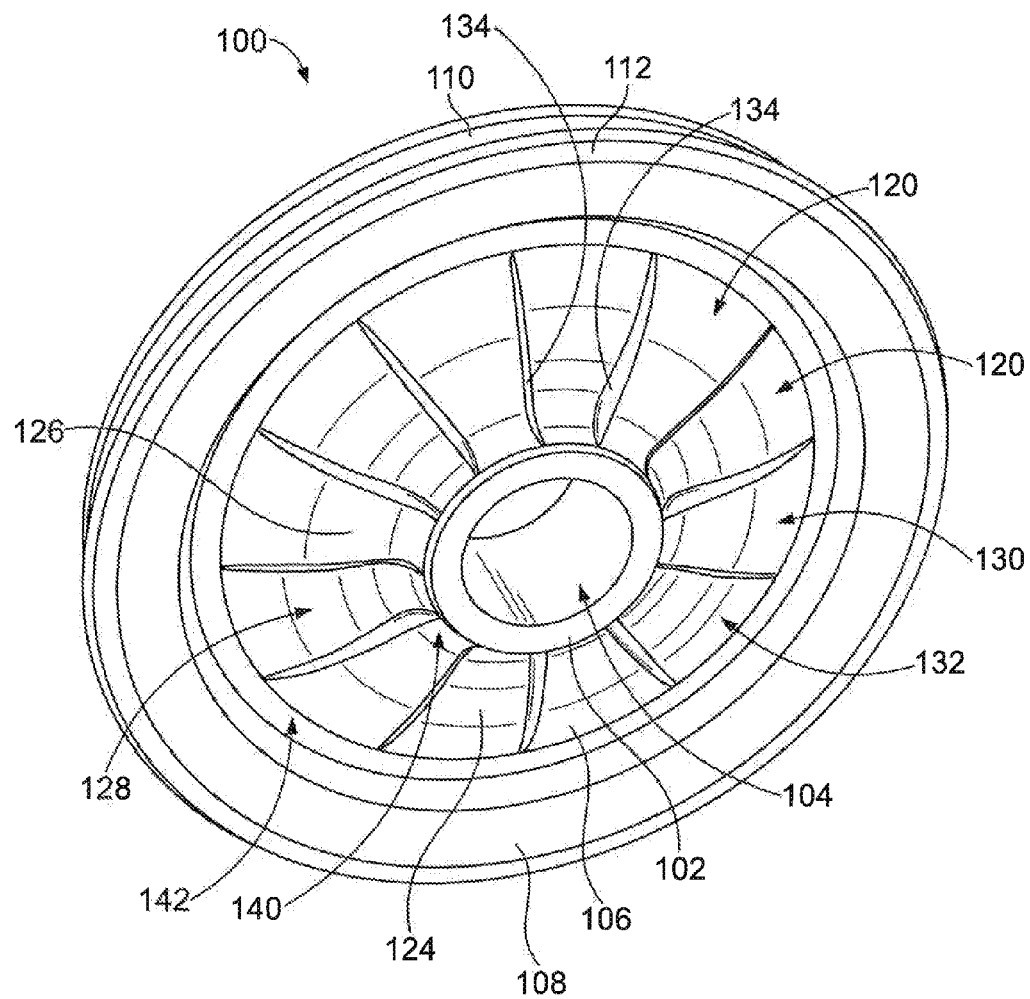
FIG. 1 illustrates a railway wheel formed in accordance with an exemplary embodiment.

FIG. 1 illustrates a railway wheel 100 formed in accordance with an exemplary embodiment. The wheel 100 includes a hub 102 having an axial bore 104 arranged to receive, in a conventional manner, one end of an axial (not shown). Formed integrally with the hub 102 and extending radially thereof is a plate 106. A rim 108 is peripherally formed at the radially outer edge of the plate 106. The rim 108 has a tread surface 110 and flange 112 extending radially outward of the tread surface 110 on the inboard side of the wheel 100. In an exemplary embodiment, the rim 108 is axially offset from the hub 102 toward the outboard side of the wheel 100 in a conventional manner.

In an exemplary embodiment, the wheel 100 is formed using a casting process where molten metal, such as molten steel, is poured into a mold cavity to form the wheel 100. In an exemplary embodiment, the molten steel is top poured into the mold cavity to fill the mold cavity. Alternatively, the molten steel may be bottom pressure poured into the mold cavity. A central hub riser is used to store excess molten metal for a period of time during the casting process to be able to supply the molten metal downwardly into the cavity to assure complete filling of the mold cavity and proper porosity of the metal in the wheel 100 after solidification. The molten metal remains liquid for a long enough period of time to supply the mold cavity with molten metal during cooling and solidification of the wheel 100. The molten metal flows from the hub riser through the plate 106 into the rim 108 as the wheel 100 cools and solidifies. The solidification generally takes place from the outside of the wheel 100 to the inside of the wheel 100.

In an exemplary embodiment, the wheel 100, particularly at the plate 106, has areas of different thicknesses, for example some thick areas and some thin areas, to balance adequate molten flow of the metal during solidification through the thicker areas with the competing advantage of reducing the overall weight of the wheel 100. The thin areas of the plate 106 reduce the overall weight of the wheel 100 as less metal material is provided in such areas. The thick areas of the plate 106 act as gutters or pipes to feed the rim 108, thus creating molten tubes for the molten metal to flow during cooling and solidification of the wheel 100. As the wheel 100 cools from the outside in, the wheel 100 in the thicker area remains molten (non-solidified) for a longer period of time, allowing the molten metal to flow from the hub 102 to the rim 108 for a longer period of time.

Figure 2:
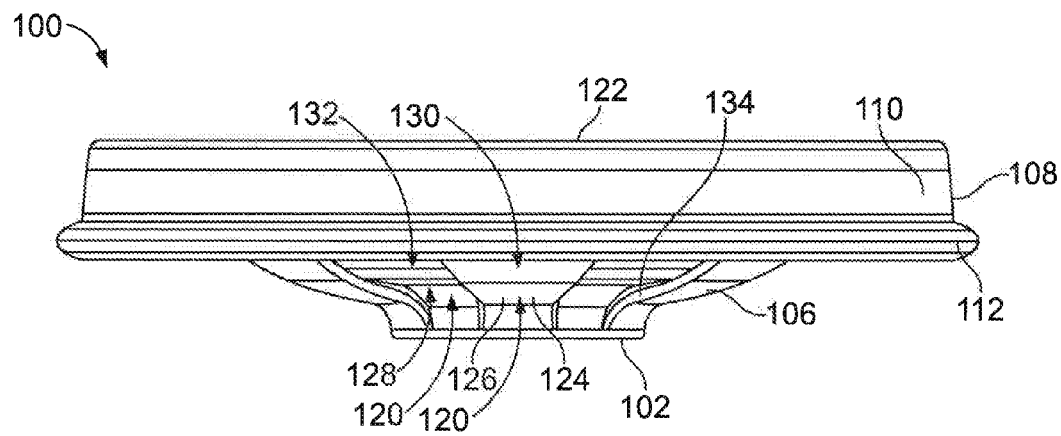
FIG. 2 is a top view of the wheel shown in FIG. 1.
Figure 3:
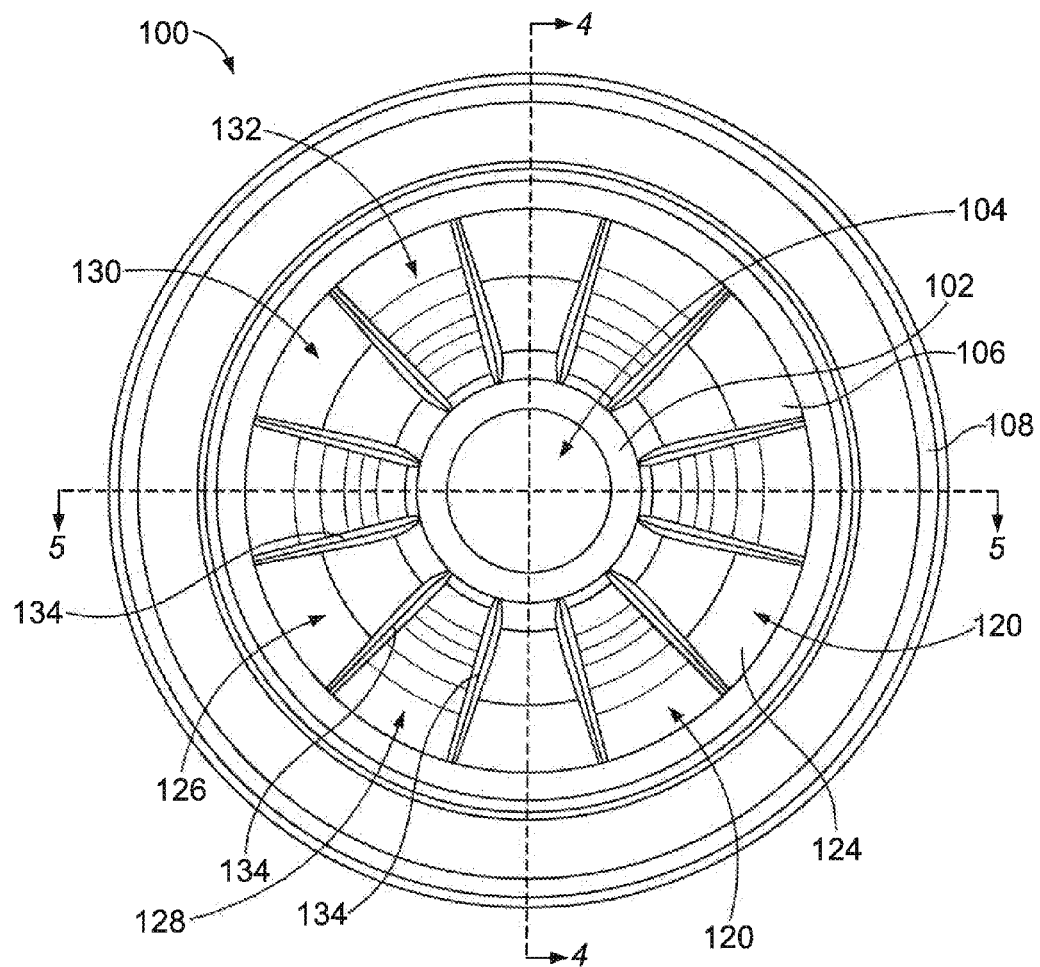
FIG. 3 is a rear view of the wheel shown in FIG. 1.
Figure 4:
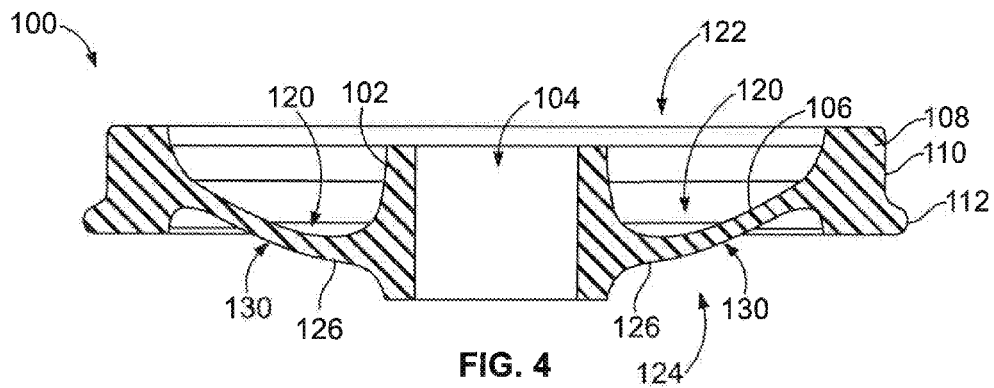
FIG. 4 is a cross-sectional view of the wheel taken through a thicker area of the wheel.
Figure 5:
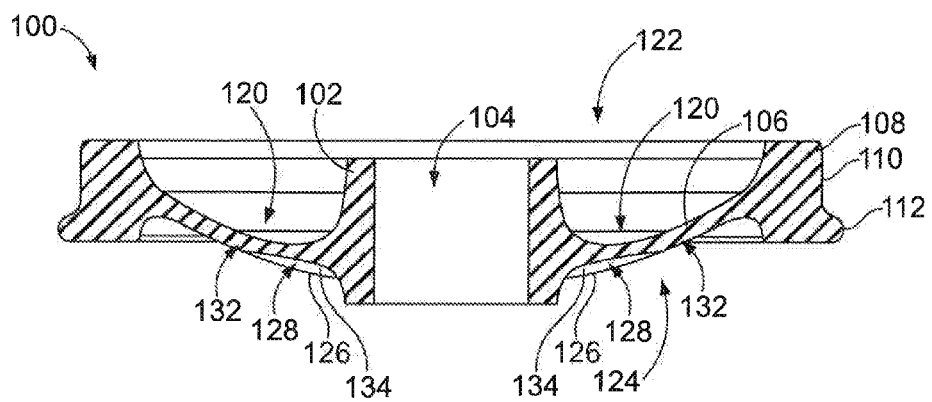
FIG. 5 is a cross-sectional view of the wheel taken through a thinner area of the wheel.

FIG. 2 is a top view of the wheel 100. FIG. 3 is a rear view of the wheel 100 showing the inboard side of the wheel 100. FIG. 4 is a cross-sectional view of the wheel 100 taken through a thicker area of the wheel 100, as shown by the line 4-4 in FIG. 3. FIG. 5 is a cross-sectional view of the wheel 100 taken through a thinner area of the wheel 100, as shown by the line 5-5 in FIG. 3.

With reference to FIGS. 1-5, the variable thickness plate 106 is shown to include a plurality of spokes 120 extending between the hub 102 and the rim 108. The spokes 120 are integral with one another and formed during a casting of the wheel 100 such that the plate 106 is continuous between the hub 102 and the rim 108. Adjacent spokes 120 have different thicknesses defined between a front face 122 and a rear face 124 of the plate 106. The front face 122 is outboard facing while the rear face 124 is inboard facing. In the illustrated embodiment, the front face 122 of the plate 106 is smooth and continuous, however it is realized that the front face 122 may be discontinuous and include similar features as described hereafter with respect to the rear face 124. For example, in an alternative embodiment, the ridges and voids 126, 128 may be provided on the front face 122 rather than the rear face 124. In other alternative embodiments, ridges and voids 126, 128 may be provided on both the front face 122 and the rear face 124. In such embodiment, the ridges 126 on the front and rear faces 122, 124 may be aligned with one another and the voids 128 on the front and rear faces 122, 124 may be aligned with one another.

The rear face 124 of the plate 106 is discontinuous and defined by a series of ridges 126 and voids 128 between the ridges 126. The ridges and voids 126, 128 define corresponding spokes 120. For example, one spoke 120 is defined by the area of the plate 106 having one of the ridges 126 while an adjacent spoke 120 is defined by the area of the plate 106 having one of the voids 128.

The spokes 120 include a series of circumferentially positioned and alternating major and minor spokes 130, 132. The major spokes 130 are thicker than adjacent minor spokes 132. The minor spokes 132 are thinner than adjacent major spokes 130. The major spokes 130 are the portions of the plate 106 having the ridges 126. The minor spokes 132 are the portions of the plate 106 having the voids 128. The ridges 126 increase the thickness of the major spokes 130 as compared to the minor spokes 132. The voids 128 are defined exterior of the plate 106 along the minor spokes 132 between the ridges 126.

The major spokes 130 (e.g., the thicker spokes) allow a greater volume of molten metal to flow from the hub 102 toward the rim 108 during casting of the wheel 100. The minor spokes 132 (e.g., the thinner spokes) in essence have a volume of the wheel 100 removed (e.g., the void 128) to decrease the weight of the wheel 100. The size (e.g., width, thickness, length, shape) of the voids 128 may be selected to balance the weight reduction versus the structural integrity and strength of the wheel 100. The size (e.g., width, thickness, length, shape) of the ridges 126 may be selected to control the supply of molten steel from the hub riser through the plate 106 to the rim 108 during the casting process. For example, having larger ridges 126 allows a greater volume of molten steel to flow to the rim 108 during the solidification process. For example, having larger ridges 126 allows the molten tube to last for a longer period time, taking a longer period of time for the interior of the wheel 100 (e.g., in the area of the ridges 126) to solidify.

Shoulders 134 define the outer edges of the ridges 126. The voids 128 are defined between shoulders 134 of adjacent ridges 126. The shoulders 134 define boundaries between adjacent major and minor spokes 130, 132. In an exemplary embodiment, the shoulders 134 extend generally perpendicular with respect to the rear face 124. Optionally, the shoulders 134 may be curved to provide a smooth transition between the discontinuous surfaces of the rear face 124. For example, a fillet may be provided at the bottom of the shoulders 134. Alternatively, the shoulders 134 may be angled at a non-perpendicular angle with respect to the rear face 124.

In an exemplary embodiment, an equal number of ridges 126 and voids 128 are provided. The voids 128 are interleaved between the ridges 126. in an exemplary embodiment, the ridges 126 may comprise approximately half of the rear face 124 of the plate 106 and the voids 128 may comprise approximately half of the rear face 124 of the plate 106. The area covered by the voids 128 or the ridges 126 may depend on the size and shape of the voids 128 and ridges 126. In some embodiments, the voids 128 may comprise over half of the rear face 124 of the plate 106. In other embodiments, the ridges 126 may comprise over half of the rear face 124 of the plate 106. In the illustrated embodiment, the plate 106 includes six ridges 126 and six voids 128 interleaved between the ridges 126. The plate 106 may include more or less than six ridges 126 and voids 128 in alternative embodiments. Optionally, the plate 106 may include between approximately four and eight ridges 126 with corresponding voids 128 interleaved therebetween. The number of ridges 126 and voids 128 may depend on the diameter of the wheel 100, the desired amount of weight reduction of the wheel 100, the amount of molten metal required to flow from the hub 102 to the rim 108 during casting and/or the rate of cooling and solidification of the wheel 100 during the casting process. In the illustrated embodiment, the ridges 126 and voids 128 define approximately equal truncated sectors of the plate 106. The shoulders 134 extend radially outward from the hub 102 such that the spokes 120 are generally pie shaped. Centerlines of the ridges 126 extend generally radially outward from the hub 102 toward the rim 108. Other shapes are possible in alternative embodiments. Optionally, the ridges 126 may be shaped differently than the voids 128.

Figure 6:
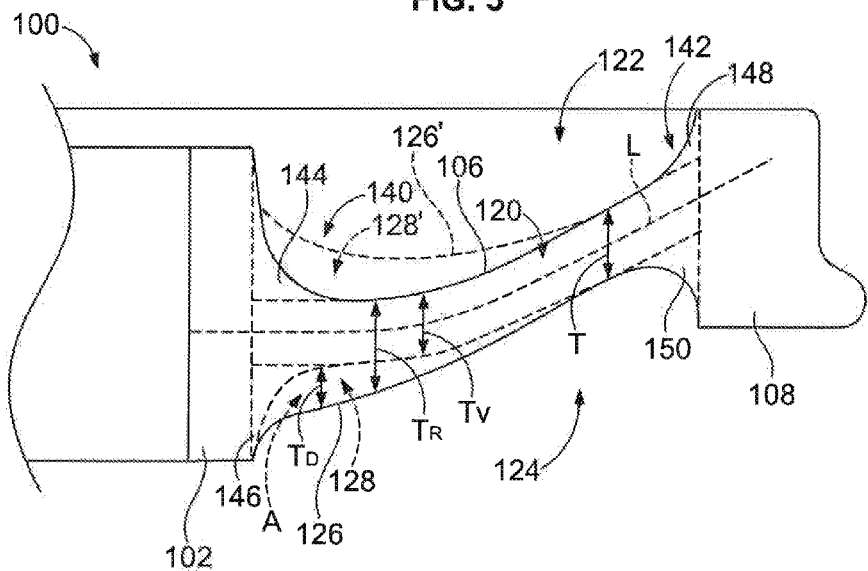
FIG. 6 is a cross-sectional view of the wheel showing the difference in thickness of the plate along the thicker and thinner sections of the wheel.

FIG. 6 is a cross-sectional view of the wheel 100 showing the difference in thickness of the plate 106 along both the major spoke 130 and the minor spoke 132 (shown in phantom), which are both identified in FIG. 3. The plate 106 at the ridges 126 is thicker than the plate 106 at the voids 128. An area A is defined by the ridge 126 which is an increased area of the plate 106 that allows a greater volume of molten metal to flow from the hub 102 to the rim 108 during casting of the wheel 100. The increased thickness of the plate 106 at the ridge 126 allows a greater volume of molten metal to flow from the hub 102 toward the rim 108 during casting of the railway wheel 100. The plate 106 at the voids 128 is thinner than the plate 106 at the ridges 126.

A thickness T of the plate 106 is defined between the front face 122 and the rear face 124. Along the voids 128, the plate 106 has a thickness $T_V$. Along the ridges 126, the plate 106 generally has a thickness $T_R$. A radial length L of the plate 106 is defined between the hub 102 and the rim 108. The ridge thickness $T_R$ is generally greater than the void thickness $T_V$ along at least part of the radial length L of the plate 106. In an exemplary embodiment, the ridge thickness $T_R$ is greater than the void thickness $T_V$ along a majority of the radial length L. A difference in the ridge and void thicknesses $T_R$ and $T_V$ is represented by $T_D$. Optionally, the thickness difference $T_D$ is variable along the radial length L. Optionally, the thickness difference $T_D$ may be zero along at least a portion of the radial length L.

The spokes 120 have hub ends 140 proximate to the hub 102 and rim ends 142 proximate the rim 108. In an exemplary embodiment, the plate 106 includes fillets 144, 146 along the front and rear faces 122, 124 of the plate 106 at the hub end 140. The plate 106 includes fillets 148, 150 at the front and rear faces 122, 124 at the rim end 142. The fillets 144-150 provide smooth transitions between the plate 106 and the hub 102 or the rim 108. The thickness T of the plate 106 generally increases at the fillets 144-150. The fillets 144-150 tend to increase the strength of the wheel 100 at the interface between the plate 106 and the hub 102 or the rim 108. The fillets 144-150 tend to reduce stress or fatigue cracks at the interfaces between the plate 106 and the hub 102 or the rim 108.

In an exemplary embodiment, the plate 106 along the ridge 126 is thicker proximate to the hub 102 and thinner proximate to the rim 108. The difference in thickness $T_D$ of the plate 106 generally decreases along the radial length L travelling radially outward from the hub 102. In an exemplary embodiment, the void thickness $T_V$ of the plate 106 is generally constant along the radial length L, whereas the ridge thickness $T_R$ is generally decreasing between the hub end 140 and the rim end 142. At a point P along the rear face 124, the ridge 126 transitions into the plate 106 such that radially outward of the point P the ridges and voids 126, 128 cease to exist, but rather the plate 106 has a smooth continuous surface as the plate 106 transitions into the rim 108. The difference in thickness $T_D$ radially outward of the point P is zero.

The ridges 126 define major spokes 130 and the voids 128 define minor spokes 132. In an exemplary embodiment, the thickness $T_V$ of the minor spoke 132 at the hub end 140 is significantly less than the thickness $T_R$ of the major spoke 130 at the hub end 140. The thickness $T_V$ of the minor spokes 132 at the rim end 142 is approximately equal to the thickness $T_R$ of the major spoke 130 at the rim end 142.

Figure 7:
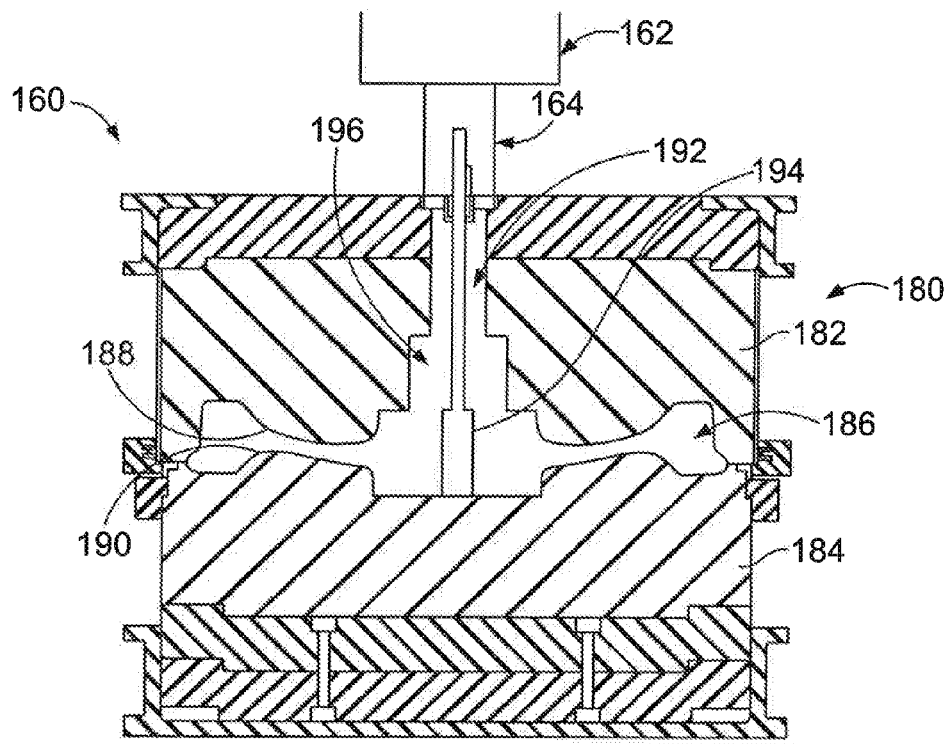
FIG. 7 is a partial sectional view of a casting assembly for manufacturing the wheel.

In an alternative embodiment, rather than the ridges 126 and voids 128 being provided on the rear face 124, the ridges and voids may be provided on the front face 122, which is shown in FIG. 6 by the ridges 126' and voids 128' shown in phantom. In other alternative embodiments, both ridges 126 and 126' may be provided on both the front and rear faces 122, 124 and both voids 128 and 128' may be provided on both the front and rear faces 122, 124. FIG. 7 is a partial sectional view of a casting assembly 160 for making a cast object, such as the wheel 100. Other objects may be cast using the methods and processes described herein. The assembly 160 includes a ladle 162 holding a molten metal, such as molten steel, and a pouring tube assembly 164 for pouring the molten steel into a mold 180. During a pouring operation, the molten metal is poured through the pouring tube assembly 164 into the mold 180. The mold 180 receives the molten metal from the pouring tube assembly 164 during the casting operation to form the railway wheel 100.

The mold 180 includes a cope section or upper section 182 and a drag section or lower section 184. The cope section 182 is placed on top of the drag section 184 to provide a complete mold assembly. The drag section 184 and the cope section 182 are usually comprised of graphite material or another material that quickly dissipates heat to cool the cast object. A mold cavity 186 is defined between the cope section 182 and the drag section 184 that is shaped to form the railway wheel 100. For example, both the cope section 182 and drag section 184 may have a portion of the wheel cavity machined therein that together define the casting for the railway wheel 100.

The cope section 182 has a first cavity face 188 defining part of the mold cavity 186. The drag section 184 has a second cavity face 190 defining part of the mold cavity 186. In an exemplary embodiment, the first and/or second cavity faces 188, 190 are shaped to define the hub 102, plate 106 and rim 108. The first and/or second cavity faces 188, 190 may include features that define the ridges and voids 126, 128 on the rear face 124 and/or front face 122 of the plate 106.

In an exemplary embodiment, the mold 180 has a hub core assembly 192 for forming the hub 102 of the wheel 100. In an exemplary embodiment, the hub core assembly 192 includes a post 194 that defines the bore 104 of the hub 102 that receives the axle. The hub core assembly 192 includes a hub riser 196 that receives excess molten metal during the pouring process. The hub riser 196 supplies the excess molten metal to the mold cavity 186 during cooling and solidification of the railway wheel 100, such as by a gravity pouring process where the excess molten metal is gravity fed from the hub riser 196 into the mold cavity 186. The gravity pouring process occurs after the pressurized pouring process and during the cooling/solidification process. In the illustrated embodiment, the hub riser 196 may be part of the cope section 182 of the mold 180. For example, the cope section 182 may include a machined cavity above the mold cavity 186 that receives that excess molten metal and holds the excess molten metal for later release into the mold cavity 186 as the railway wheel 100 cools and solidifies.

In an alternative embodiment, the huh riser 196 may be a separate component, such as a cylindrical core member that replaces the post 194 and having openings that allow the excess molten metal to flow from the hub core member into the mold cavity 186 as the railway wheel 100 cools and solidifies. The hub core member may form the bore 104 in the hub 102 by filling the space that ultimately defines the bore 104.

As the metal cools and solidifies, the metal may shrink requiring an additional volume of material to completely fill the mold cavity 186. The excess volume of molten metal in the hub riser 196 is used to fill the volume of the mold cavity 186. Optionally, the hub riser 196 (and/or the huh core) may be radially centrally located within the mold cavity 186.

Figure 8:
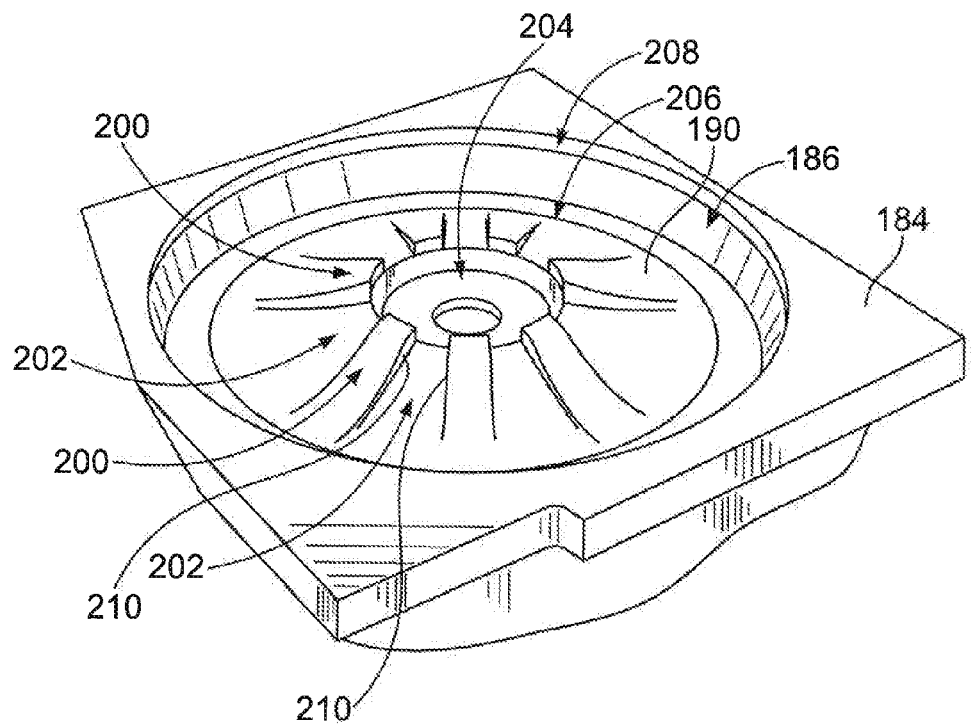
FIG. 8 illustrates an exemplary embodiment of a drag section of a mold that is used to form a rear face of the wheel.

FIG. 8 illustrates the drag section 184 of the mold 180 that is used to form the rear face 124 of the wheel 100. The drag section 184 is shaped to form the ridges 126 and voids 128. In an exemplary embodiment, the second cavity face 190 of the drag section 184 has a series of circumferentially positioned and alternating bosses 200 and cavities 202 that form corresponding voids 128 and ridges 126 on the rear face 124 of the railway wheel 100. The bosses 200 extend into the mold cavity 186 and the cavities 202 are interleaved between the bosses 200. The bosses 200 and cavities 202 may be any size and/or shape to define corresponding voids 128 and ridges 126, In the illustrated embodiment, the bosses 200 and cavities 202. define approximately equal truncated sectors of the second cavity face 190 along a plate section 204 of the second cavity face 190. The second cavity face 190 also includes a hub section 206 used to form the hub 102 and a rim section 208 used to form the rim 108. The plate section 204 is positioned between the rim and huh sections 206, 208. The plate section 204 is not smooth, but rather is discontinuous defined by the bosses 200 and cavities 202.

Shoulders 210 extend between the bosses 200 and cavities 202. The shoulders 210 extend generally perpendicular to the second cavity face 190. Optionally, the shoulders 210 may be angled at a non-perpendicular angle with respect to the second cavity face 190. The shoulders 210 may be curved to define a smooth transition between the bosses 200 and cavities 202. In an exemplary embodiment, the bosses 200 and/or cavities 202 are tapered with respect to one another such that proximate to the rim section 208 the bosses and cavities 200, 202 generally coincide with one another and proximate to the hub section 206 the bosses 200 are elevated with respect to the cavities 202.

Optionally, the bosses 200 may comprise approximately half of the area of the second cavity face 190 and the cavities 202 may comprise may comprise approximately half of the area of the second cavity face 190. The bosses 200 may comprise over half of the area of the second cavity face 190 in alternative embodiments. The cavities 202 may comprise over half of the area of the second cavity face 190 in alternative embodiments.

When the cope section 182 and drag section 184 are assembled together, the mold cavity 186 has different thicknesses along the bosses 200 as compared to along the cavities 202. The mold cavity 186 is thicker along the cavities 202, which allows a greater volume of molten metal to pour into the mold. cavity 186 through the area aligned with the cavities 202 than through the area aligned with the bosses 200. The cavities 202 ultimately form the ridges 126 of the railway wheel 100 and the bosses 200 ultimately form the voids 128 of the railway wheel 100. The bosses 200 tend to fill a volume of the mold cavity 186 reducing the amount of metal material used to form the wheel 100, thus reducing the overall weight of the wheel 100.

Figure 9:
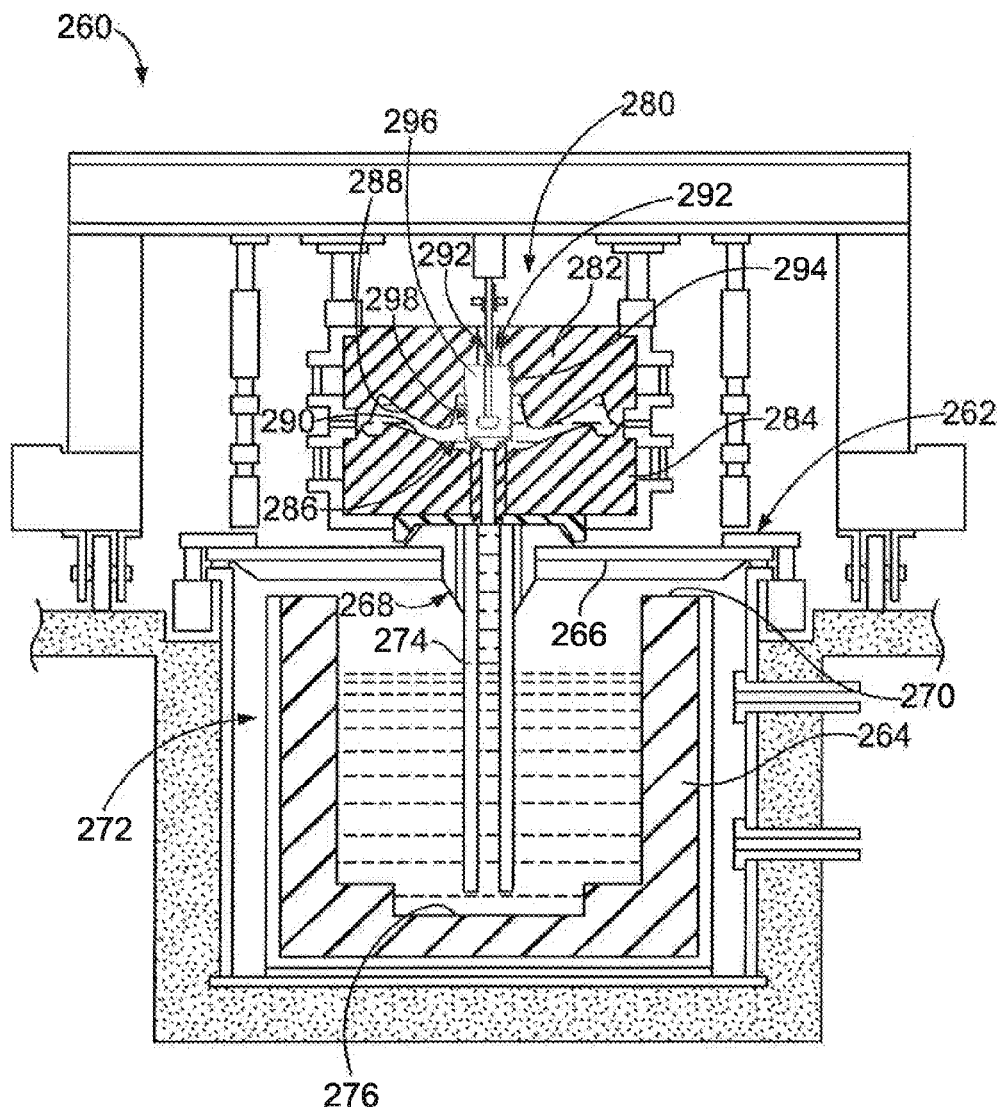
FIG. 9 is a partial sectional view of a portion of another casting assembly for manufacturing the wheel in accordance with an alternative embodiment.

FIG. 9 is a partial sectional view of a bottom pressure casting assembly 260 in accordance with an alternative embodiment for making a cast object, such as the wheel 100. Other objects may be cast using the methods and processes described herein. The assembly 260 includes a ladle 262 placed in a holding tank 264. A tank cover 266 and pouring tube assembly 268 are positioned on a top 270 of the holding tank 264 to seal a chamber 272. The pouring tube assembly 268 includes a pouring tube 274 that extends from the tank cover 266 into the ladle 262 to near a bottom 276 of the ladle 262. A molten metal, such as molten steel, is held in the ladle 262. The pouring tube 274 may be comprised of a ceramic material.

During a pouring operation, pressurized air or an inert gas is injected under pressure into the chamber 272 thereby forcing molten metal upwardly through the pouring tube 274 into a mold 280 positioned above the ladle 262 and holding tank 264. The mold 280 receives the molten metal from the pouring tube 274 during the casting operation to form the railway wheel 100.

The mold 280 includes a cope section or upper section 282 and a drag section or lower section 284. The cope section 282 is placed on top of the drag section 284 to provide a complete mold assembly. in the bottom pressure casting process, the drag section 284 and the cope section 282 are usually comprised of graphite material or another material that quickly dissipates heat to cool the cast object. A mold cavity 286 is defined between the cope section 282 and the drag section 284 that is shaped to form the railway wheel 100. For example, both the cope section 282 and drag section 284 may have a portion of the wheel cavity machined therein that together define the casting for the railway wheel 100.

The cope section 282 has a first cavity face 288 defining part of the mold cavity 286. The drag section 284 has a second cavity face 290 defining part of the mold cavity 286. In an exemplary embodiment, the first and/or second cavity faces 288, 290 are shaped to define the hub 102, plate 106 and rim 108. The first and/or second cavity faces 288, 290 may include features that define the ridges and voids 126, 128 on the rear face 124 and/or front face 122 of the plate 106.

In an exemplary embodiment, the mold 280 has a hub core assembly 292 for forming the hub 102 of the wheel 100. During casting, the hub core assembly 292 is used for stopping the pressurized pouring of molten metal through the pouring tube 274 into the mold cavity 286, such as when the mold cavity 286 is filled with the molten metal for forming the railway wheel 100.

In an exemplary embodiment, the hub core assembly 292 includes a hub core 294 for forming the bore 104 and the hub 102. The hub core 294 includes a cavity that defines a hub riser 296 that receives excess molten metal during the pressurized pouring process. The hub riser 296 supplies the excess molten metal to the mold cavity 286 during cooling and solidification of the railway wheel 100, such as by a gravity pouring process where the excess molten metal is gravity fed from the hub riser 296 into the mold cavity 286. The hub core 294 is a cylindrical core member that is movable within the mold 280. The hub core 294 includes openings 298 that allow the molten metal to flow into the hub riser 296 during pressurized pouring of molten metal from the pouring mechanism and that allow the excess molten metal to flow from the hub riser 296 into the mold cavity 286 as the railway wheel 100 cools and solidifies.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A cast steel railway wheel comprising:
 a hub having an axial bore;
 a rim concentric with the bore; and
 a plate extending radially from the hub to the rim, the plate having a front face and a rear face, the plate having a plurality of spokes extending between the hub and the rim, adjacent spokes having different thicknesses defined between the front face and the rear face, wherein the rear face of the plate is discontinous and defined by a series of ridges and voids defining corresponding spokes, and wherein the spokes have hub ends and rim ends, the spokes comprise a series of circumferentially positioned and alternating major and minor spokes, the thicknesses of the minor spokes at the hub ends being less than the thicknesses of the major spokes at the hub ends, the thicknesses of the minor spokes at the rim ends being equal to the thicknesses of the major spokes at the rim ends, and the thickness of the major spokes decreases along a radial length from the hub to the rim, and the thickness of the inner spokes is generally constant along a radial length from the hub to the rim.

2. The railway wheel of claim 1, wherein the thicker spokes allow a greater volume of molten metal to flow from the hub toward the rim during casting of the railway wheel.

3. The railway wheel of claim 1, wherein the spokes are integral with one another and formed during a casting of the railway wheel such that the plate is continuous between the hub and the rim.

4. The railway wheel of claim 1, wherein the spokes comprise a series of circumferentially positioned and alternating major and minor spokes, the major spokes being thicker than adjacent minor spokes, the minor spokes being thinner than adjacent major spokes.

5. The railway wheel of claim 4, Wherein the major spokes have ridges that increase the thickness of the major spokes, the minor spokes having voids exterior thereof defined between the ridges.

6. The railway wheel of claim 1, wherein the spokes have shoulders defining boundaries between adjacent spokes.

7. The railway wheel of claim 1, wherein the difference in thicknesses between adjacent spokes generally decrease traveling radially outward along the spokes.

8. A cast steel railway wheel comprising:
a hub having an axial bore;
a rim concentric with the bore; and
a plate extending substantially radially from the hub to the rim, the plate having a front face and a rear face, the plate having a thickness dimension defined between the front and rear faces;
wherein, on the rear face, the plate includes a series of circumferentially positioned and alternating ridges and voids, the plate at the ridges being thicker than the plate at adjacent voids and the plate at the voids being thinner than the plate at adjacent ridges, and wherein the ridges are comprised of spokes, and wherein the spokes have hub ends and rim ends, the spokes comprise a series of circumferentially positioned and alternating major and minor spokes, the thickness of the minor spokes at the hub ends being less than the thicknesses of the major spokes at the hub ends, the thickness of the minor spokes at the rim ends being equal to the thickness of the major spokes at the rims ends, and the thickness of the major spokes decreases along a radial length from the hub to the rim, and the thickness of the inner spokes is generally constant along a radial length from the hub to the rim.

9. The railway wheel of claim 8, wherein the increased thickness of the plate at the ridges allow a greater volume of molten metal to flow from the hub toward the rim during casting of the railway wheel.

10. The railway wheel of claim 8, wherein the difference in thicknesses of the plate along the ridges compared to along the voids generally decrease travelling radially outward from the hub.

11. The railway wheel of claim 8, wherein the plate includes shoulders defining boundaries between the ridges and voids.

12. The railway wheel of claim 8, wherein the ridges comprise approximately half of the plate and the voids comprise approximately half of the plate.

13. The railway wheel of claim 8, wherein the plate includes between approximately four and eight ridges with the voids interleaved between the ridges.

14. The railway wheel of claim 8, wherein the ridges and voids define approximately equal truncated sectors of the plate.

15. The railway wheel of claim 8, wherein the plate along the ridges is thicker proximate to the hub and thinner proximate to the rim.

* * * * *